United States Patent [19]

Tsukagoshi et al.

[11] 4,254,184

[45] Mar. 3, 1981

[54] VIBRATING MEMBER FOR ACOUSTIC TRANSDUCER AND METHOD FOR MANUFACTURING THE SAME

[75] Inventors: Tsunehiro Tsukagoshi; Shin-ichi Suzuki; Hitomi Ogino, all of Tokyo, Japan

[73] Assignee: Pioneer Electronic Corporation, Tokyo, Japan

[21] Appl. No.: 691,255

[22] Filed: May 28, 1976

[30] Foreign Application Priority Data

May 30, 1975 [JP] Japan .................................. 50-64103

[51] Int. Cl.³ .................. G10K 13/00; G11B 3/02
[52] U.S. Cl. ................................ 428/408; 29/594;
148/6; 148/11.5 F; 148/11.5 A; 148/11.5 Q;
148/20; 148/20.3; 148/32; 181/167; 181/168;
181/169; 181/170; 264/134; 264/255; 427/369;
427/370; 427/419.7; 427/13; 427/180; 428/411;
428/446; 428/450; 428/457; 369/173; 75/175.5;
75/138; 75/148; 75/150
[58] Field of Search .................. 181/167–172;
148/31.5, 13.1, 20, 20.3, 11.5 A, 11.5 F, 11.5 Q,
6; 264/134, 255; 427/369, 370, 113; 29/594;
274/38; 428/408, 411, 446, 450, 457

[56] References Cited

U.S. PATENT DOCUMENTS

| 2,186,189 | 1/1940 | Bangratz | 427/113 |
|---|---|---|---|
| 2,773,472 | 12/1956 | Lamm | 427/13 |
| 2,804,410 | 8/1957 | Wyatt | 148/13.1 |
| 2,873,813 | 2/1959 | Haerther | 264/134 |
| 2,950,233 | 8/1960 | Steinberg | 204/37 |
| 3,164,489 | 1/1965 | Timper | 427/113 |
| 3,429,753 | 2/1969 | Wagner | 148/6 |
| 3,504,063 | 3/1970 | Lemelson | 264/255 |
| 3,508,977 | 4/1970 | Busche | 148/6.11 |
| 3,514,312 | 5/1970 | Gardiner | 264/134 |
| 3,598,896 | 8/1971 | Hassler | 264/134 |
| 3,870,569 | 3/1975 | Krzyminski | 148/6 |
| 3,918,723 | 11/1975 | Nakajima et al. | 274/37 |
| 3,957,273 | 5/1976 | Bons | 274/37 |
| 3,961,797 | 6/1976 | Tsukagoshi | 274/37 |
| 3,992,017 | 11/1976 | Mori et al. | 274/37 |
| 4,089,530 | 5/1978 | Kawabe et al. | 274/37 |
| 4,114,896 | 9/1978 | Okura | 274/37 |
| 4,135,601 | 1/1979 | Tsukagoshi et al. | 181/167 |

*Primary Examiner*—John D. Smith
*Attorney, Agent, or Firm*—Sughrue, Rothwell, Mion, Zinn and Macpeak

[57] ABSTRACT

A vibrating member made of a thin metal plate and adapted to be used in an acoustic transducer such as a loudspeaker or microphone is diffused at least partially with an inorganic substance to improve the acoustic characteristics thereof, particularly the high frequency range.

27 Claims, 21 Drawing Figures

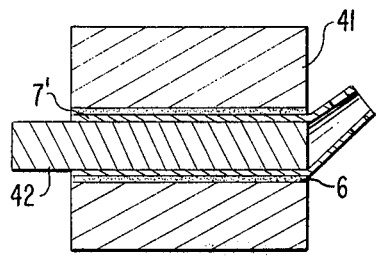
FIG 11
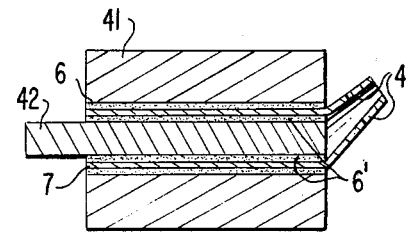
FIG 12
FIG 13
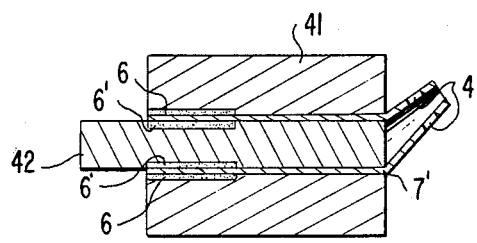
FIG 14
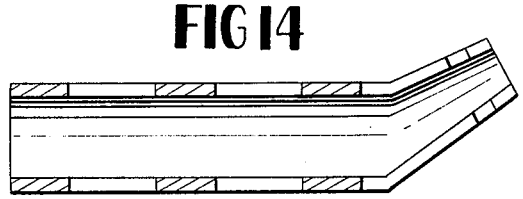
FIG 15
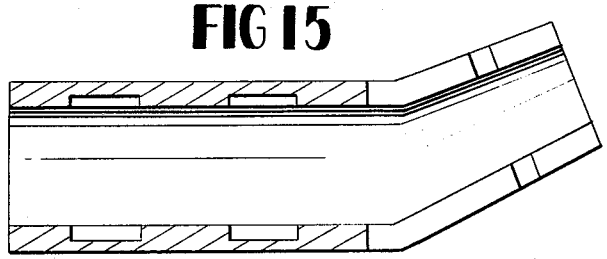

VIBRATING MEMBER FOR ACOUSTIC TRANSDUCER AND METHOD FOR MANUFACTURING THE SAME

BACKGROUND OF THE INVENTION

The vibrating member for use in an acoustic transducer, such as a diaphragm of a loudspeaker or a microphone, or a cantilever of a pickup cartridge of a disc-record player, is usually constructed of aluminum or titanium etc. which is light in weight and easily formable.

For the diaphragm of aluminum or titanium, there is a vibration mode produced which is spread throughout the diaphragm and provides a unique peak in its high frequency characteristics causing the reproduced sound quality to be considerably degraded.

When the vibrating member is a cantilever, it occupies a major part of the effective mass of the vibration system, so that it becomes difficult to minimize the effective mass of the vibration system to improve the performance of the cartridge except by reducing the mass of the cantilever. However, if the wall thickness and the diameter of the cantilever are reduced to minimize the weight thereof, the rigidity thereof is necessarily reduced causing the overall characteristics of the cantilever to be degraded.

In order to overcome the above mentioned disadvantages of the conventional vibrating member, an inorganic material having a large ratio of Young's modulus E to density $\rho$ should be used in fabricating the vibrating member. Examples of such material include boron, beryllium etc. Boron, particularly of high purity, is relatively difficult to obtain and beryllium can not be prepared without incurring large expenses to install equipment for preventing public pollution. Moreover, boron and beryllium are difficult to form mechanically.

It has been proposed to form a vibrating member consisting solely of boron or beryllium, and thereby avoid the latter difficulty, by forming a coating layer of beryllium or boron on a suitably configured substrate of easily formable material and thereafter separating the coating layer from the substrate. The coating layer thus obtained is ready to use as a diaphragm or the like according to the specific shape of the substrate. However, the coating layer which would be provided by a vapor-deposition process is mechanically fragile. Moreover, an expensive installation, including electron beam apparatus and other equipment, is necessary to provide such coating on the substrate. In addition to this, the time required to provide the coating is considerably long. Therefore, the use of boron or beryllium, alone, for mechanically forming the vibrating member has not been practiced.

Therefore, it had been proposed to use aluminium or titanium, which is easily formable, as a substrate of the vibrating member and to coat the substrate with boron or beryllium by means of physical evaporation or chemical processing to form a coating layer. As is well known, in order to obtain good properties of the deposited layer and a good adhesion thereof to the substrate, it is desirable to heat the substrate to a temperature higher than 150° C. However, since the thermal expansion coefficiencies of the coating layer and the substrate are usually very different, there is a strong possibility of mechanical deformation of the substrate and/or cracking of the coating layer by a subsequent cooling to the normal temperature after the heating and deposition process.

SUMMARY OF THE INVENTION

The present invention relates to a vibrating member of the type mentioned above and a method for fabricating the vibrating member.

An object of the present invention is to improve the ratio $E/\rho$ of a vibrating member of easily formable material by treating the surface of the vibrating member with a suitable material such as boron.

Another object of the present invention is to provide a vibrating member which can be manufactured economically and which has a high performance. The vibrating member according to the present invention is free from mechanical deformation of the substrate thereof and cracking thereof.

Another object of the present invention is to provide a method for treating the surface of the vibrating member with a suitable material such as boron.

Another object of the present invention is to improve the economy of the method for treating the surface of the vibrating member.

Another object of the present invention is to provide a method of diffusing a suitable inorganic material having properties different from those of a substrate into the latter to thereby provide a vibrating member for acoustic transducing purposes, which has a high performance and is easily and economically mass-produced with uniform quality.

BRIEF DESCRIPTION OF THE DRAWINGS

FIG. 11 shows a diffusion into a cantilever;

FIG. 12 shows another diffusion into a cantilever;

FIG. 13 is a modification of the arrangement of FIG. 12;

FIGS. 14 and 15 are selectively diffused cantilevers, respectively.

DETAILED DESCRIPTION OF THE EMBODIMENTS

According to the present invention a vibrating member is formed by using as a substrate a first material which is suitable as a vibrating member, and strengthening the first material and improving its acoustic properties by diffusing into at least one surface thereof a second material, the final product having a higher ratio of $E/\rho$ than the substrate alone. The first material may be selected from the group consisting of titanium, beryllium, aluminum, carbon, plastic filled with carbon fibers, and equivalents thereof. The second material may be selected from the group consisting of boron, nitrogen, silicon, materials having as the major constituent boron, nitrogen or silicon, and equivalents thereof. However, the materials for the substrate and the diffusion layer should be selected so that they are compatible. For example, a combination of titanium and boron, carbon and boron, or carbon and silicon is most suitable in view of the ratio $E/\rho$. Further, it should be noted that other compounds or alloys can be employed for each of the substrate material and the diffusion material.

Figure 1:
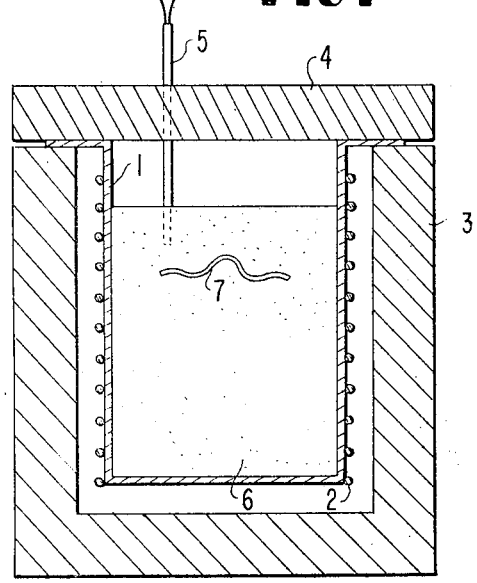
FIG. 1 is a cross sectional view of an apparatus for performing a method of the present invention.

FIG. 1 shows an apparatus for manufacturing the vibrating member according to the present invention, which comprises an inner container 1 of stainless steel, a heater wire 2 wound on the outer peripheral surface of the container 1, an outer container 3 of refractory material for receiving the inner container 1 therein, a closure plate 4 of refractory material for the outer container 3 and a temperature detector 5 inserted through the closure 4 into the inner container 1 for detecting the temperature of a diffusion material such as boron powder 6 filling the inner container 1.

Figure 2:
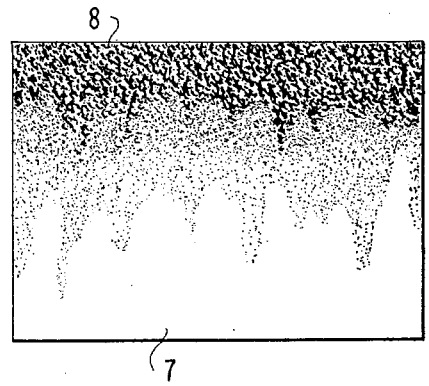
FIG. 2 is a cross section of a portion of a boron diffused substrate.

A substrate 7 of a suitable material such as titanium which is previously formed to a desired shape suitable as a diaphragm or cantilever is buried in the boron powder 6 in the inner container 1 and an electric current is supplied to the coil 2 to heat the boron powder 6 as well as the substrate to a temperature in a range from 800° C. to 1000° C. The boron powder 6 is diffused into the surfaces of the substrate 7, resulting in a boron-diffused layer 8 as shown in FIG. 2. Since the boron-diffused layer 8 takes the form of comb teeth anchored into the substrate 7, it cannot be peeled away from the substrate. The ratio $E/\rho$ of the substrate 7 is much improved by the boron diffusion.

Therefore, with the use of the substrate 7 having the boron diffused layer 8, the upper limit of the operating frequency of the vibration system using the present substrate becomes higher than that of the conventional system and the quality of the vibrating member can be made uniform because the boron diffusion layer 8 is evenly distributed throughout the surface of the vibrating member. Since the layer 8 is formed by diffusion into the substrate 7, the engagement therebetween is very strong and acts also as a protective layer for the substrate 7 due to the physical properties of boron. The method for diffusing boron into the substrate 7 is simple and the apparatus for performing the method is also simple. Therefore, mass-production of the vibrating member is easily realized economically.

In this embodiment, the boron diffusion layer 8 is formed on both surfaces of the substrate 7. However, it is also possible to form it on only one surface thereof. Furthermore, it is possible to diffuse boron throughout the thickness of the substrate 7.

Figure 3:
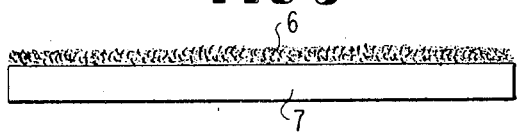
FIG. 3 is an illustration of a portion of the substrate having a coating layer of boron in powder form.

In the embodiment of FIG. 1, the diffusion material such as boron is in the form of a powder and the substrate 7 is buried therein. As will be clear to those of ordinary skill in the art, the amount of boron, which is an expensive material, must be large enough to sufficiently cover the substrate inserted thereinto. In order to minimize the amount of boron, it is desirable to provide uniformly a suitable amount of boron on at least one surface of the substrate as shown in FIG. 3. As a method of obtaining the uniform provision of boron on the surface of the substrate, an electrostatic method and a painting method are considered suitable. In the electro-static method, fine particles of boron are electrostatically charged so as to be attracted onto the surface of the substrate which is oppositely charged. The painting method utilizes a liquid suspending the diffusion material particles and the liquid is sprayed or painted on the surface of the substrate.

In FIG. 3, a coating layer 6 of a suitable diffusion material such as boron in the form of powder is provided on one surface of a substrate 7 which is a suitable inorganic substance and has a suitable shape to be used as a vibrating member of an acoustic transducer. For example a direct current electric field is applied between the substrate 7 and the diffusion material 6. The diffusion material in the form of powder is then directed onto the surface of the substrate 7 by the electric field or a combination of the latter and a compressed air blow so that the charged particles of the diffusion material adhere to the surface of the substrate 7 as a coating layer. With the formation of the coating layer 6 of the diffusion material on the substrate 7 by means of the electrostatic attraction, the coating layer 6 is held as it is even when the d.c. electric field is removed. The boron on the surface of the substrate 7 is then diffused into the substrate by a heat treating process.

As the painting or spraying method for forming the coating layer of the diffusion material on the substrate 7, a solution of a suitable material suspending the diffusion material in the form of particles may be used. That is, the solution is painted or sprayed onto the surface of the substrate 7 and then the solution is evaporated leaving the suspended particles of the diffusion material on the surface. The evaporation of the liquid may be performed by using either an additional heater or the heat energy for performing the diffusion of the material into the substrate 7. The liquid suitable to suspend the diffusion material should be one which does not react with the diffusion material and can be evaporated without leaving any materials which constitute an obstacle to the diffusion after the evaporation. Water is the most convenient example for this purpose. When there is a possibility that the surface of the substrate 7 is contaminated with oil etc., a highly volatile organic solution such as Trichlene (trichloroethylene), acetone, thinner, and alcohols such as ethyl alcohol and methyl alcohol may be used as the liquid.

The size of the particles of the diffusion material should be as small as possible, because the smaller the size, the larger the contact area, resulting in more effective diffusion. It has been found empirically that a particle diameter of $50\mu$ or smaller provides a good result and of $10\mu$ or smaller provides a better result.

After the coating layer 6 is formed on the surface of the substrate 7 according to either of the above mentioned methods, the substrate 7 is heated by a suitable means up to a temperature at which the diffusion material constituting the coating layer 6 migrates into the substrate 7 to form a diffusion zone 8 in the substrate 7. In case where any residual diffusion material is left as it is on the surface of the substrate after the diffusion process is completed, it may be removed therefrom by any external force.

Figure 4:
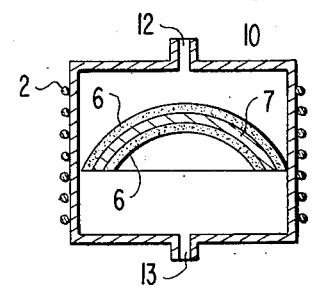
FIG. 4 is another apparatus for performing the present invention.

The heating means for heating the substrate for diffusing the diffusion material thereinto may be of any type, such as for example, the electron bombardment technique may be used for this purpose although an induction heating furnace or an electric heating furnace is usually used. FIG. 4 shows an induction furnace which comprises a container 10, exhaust openings 12 and 13, and an induction coil 14. The substrate 7 therein has coating layers 6 provided on both surface thereof.

Since the coating layers 6 provided according to the present invention contacts intimately with the surface of the substrate 7, the diffusion thereof into the substrate can be effectively performed with a simple apparatus and a small number of steps, and therefore the present invention is suitable to mass-produce the articles with uniform quality. This method is effectively applicable to, particularly, the diffusion of some material such as boron which is difficult to form a coating layer thereof by physical evaporation or other chemical processing.

In the embodiment described hereinbefore, the diffusion is performed by putting the substrate, provided with the coating layer on one or both of the surfaces thereof, in a suitable heating means such as a furnace and heating the substrate. This is effective in some cases where the number of the substrates to be diffused is relatively small and the material constituting the substrate is hardly deformed by the heating process. When the number of the articles to be produced is relatively large and the substrate itself is easily deformable by heating, it is undesirable to put the substrates in a relatively large furnace in a free condition.

Figure 5:
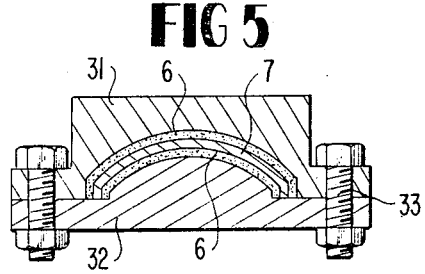
FIG. 5 shows an example of a diffusion process using a die assembly.

FIG. 5 shows another embodiment in which a pair of dies 31, 32 are used to support the substrate 7 with the coating layers 6. In FIG. 5, the substrate 7, which has a desired configuration and is provided with the coating layers 6 on both surfaces thereof according to the previously mentioned techniques, is held by the male and female dies 31 and 32 which provide, when assembled, a space therebetween, in which the substrate 7 fits.

The dies should be made of a refractory material having a small expansion coefficiency at high temperatures. It is advisable to use carbon, tungsten, molybdenum, tantalum, stainless steel or various ceramics as the material of the dies which should be selected according to the temperature necessary to obtain an effective diffusion. The dies 31 and 32 are assembled by means of a plurality of bolts and nuts 33.

The assembly is heated to 900° C.–1300° C. for about two hours in the case where boron is used as the diffusion material. After the completion of this heat process, the assembly is cooled to the normal temperature and thereafter the boron diffused substrate is separated from the dies by unscrewing the tightening means 33.

When the diffusing method in FIG. 5, is used, the provision of the coating layer can be performed by other methods than the electrostatic method and the suspension spraying or painting method. For example, the diffusion material need not be a solid inorganic substance, but can be a substance in the gas or liquid phase. When the diffusion material is a substance in the gas phase, the dies may be provided with a plurality of small openings through which the surfaces of the substrate communicate with the external atmosphere. The size of such openings may be on the order of several microns to several tens of microns. The assembly is placed in an atmosphere of the gaseous diffusion material and heated, so that the diffusion material reaches the surfaces of the substrate held between the dies and diffuses thereinto. In a typical example, ammonia gas and titanium are used as the diffusion material and the substrate material, respectively. In this case, nitrogen from the ammonia will diffuse into the titanium substrate, resulting in a titanium nitride (TiN) zone in the substrate.

Figure 6:
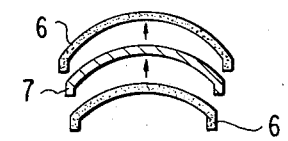
FIG. 6 is another example of a method for providing coating layers onto the surfaces of the substrate.
Figure 7:
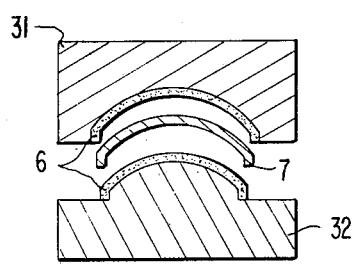
FIG. 7 shows another example using the die assembly.

According to another embodiment of the present invention, the coating layers 6 of the diffusion material are previously prepared independently. FIGS. 6 and 7 show this embodiment. In these Figures, the substrate 7 which is of the dome shape and suitable to use as a diaphragm of a loudspeaker is firstly prepared by a press technique or the like. The material of the substrate 7 may be an inorganic substance such as titanium, carbon or aluminum etc.

Coating layers 6 of diffusion material which are analogous in configuration to the substrate 7 and have dimensions suitable to intimately contact with the surfaces of the substrate 7 when assembled as shown are prepared in a suitable manner. The material of the coating layers is an inorganic substance such as boron or silicon etc. which has different properties from those of the material constituting the substrate 7. After the diaphragm 7 and the coating layers 6 are assembled, the assembly is heated to cause the material of the coating layers to diffuse into the substrate 7.

The latter method is satisfactory to some extent. However, it is somewhat difficult to prepare the thin uniform coating layers as mentioned previously because the coating layer is usually fragile in nature. In order to overcome these difficulties and to avoid any deformations of these elements, it is proposed to use dies such as used in the previous embodiment and to form the coating layers on the inner surfaces of the respective dies as shown in FIG. 7.

The provision of the coating layers on the inner surfaces of the dies can be acheived by chemical process such as by vapor-deposition or by painting or spraying a suspension solution of the diffusion material as a matter of course as in the previous embodiment.

By tightly holding the substrate between the dies, so that the coating layers on the inner surfaces of the dies intimately contact with the surfaces of the substrate, and heating the assembly a desired diffusion can be obtained.

It has been found, however, that, during the diffusion process the surfaces of the substrate are oxidized due to the high temperature heating in a range from several hundred to over one thousand degrees Centigrade. As a result, the substrate having the diffused zones therein becomes very fragile, rendering the vibrating member unsuitable to use in the vibrating system. That is, in the case where the vibrating member is applied to an acoustic vibrating system and a large driving force is exerted thereon, it may be broken due to the fragility thereof. Furthermore, even if it is not broken the acoustic characteristics, such as distortion and/or conversion efficiency, may be degraded. In the case where the vibrating member is a cantilever, the inner distortion thereof is apt to occur together with the above mentioned defects.

In order to prevent the oxidation of the surfaces of the substrate, the inventors have found that some additive should be added to the diffusion material. The additive should be selected according to the diffusion material to be used. For example, when boron and titanium are used as the diffusion material and the substrate material, respectively, the additive may be a mixture of carbon black and sodium carbonate. In this case, the ratio in weight of boron, carbon black and sodium carbonate may be 78-80%, 5-40% and 2-30%, respectively.

Figure 8A:
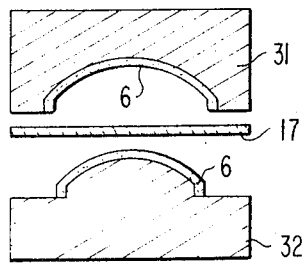
FIGS. 8A and 8B show another example in which the substrate is shaped simultaneously with the assembly of the dies.
Figure 8B:
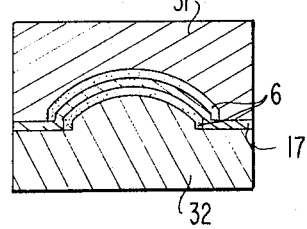

In the embodiment shown in FIGS. 6 and 7, the diaphragm 7 is previously shaped. However, if the coating layers are rigidly provided on the respective inner surfaces of the dies, it is possible to use the dies as press dies. For example, as shown in FIG. 8A, a flat plate of, for example, titanium is supported horizontally between the dies 31 and 32 which have, on the inner surfaces thereof, the coating layers attached firmly thereto. By pressing suitably the flat plate 17 with the dies 31 and 32 as shown in FIG. 8B, the flat plate 17 is shaped suitably. The heating process in this case may be the same as that in any of the previous embodiments.

Figure 9A:
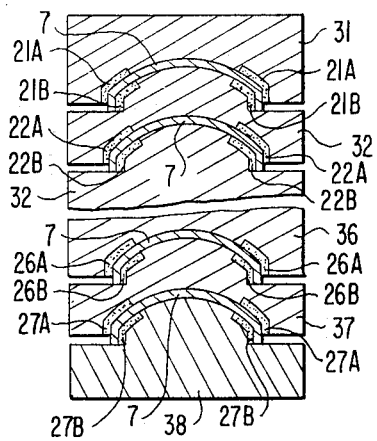
FIG. 9A shows another method of producing a plurality of diaphragms each having a diffused zone in the peripheral portion thereof.
Figure 9B:
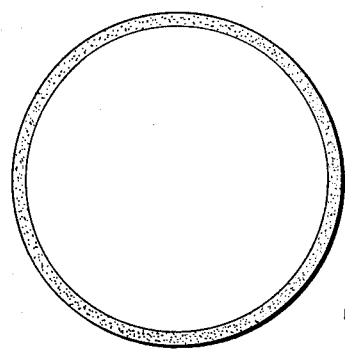
FIG. 9B is a plan view of the diaphragm produced according to the method in FIG. 9A.

FIG. 9 shows another embodiment of the present invention. In FIG. 9, a plurality of stacked dies 31 to 38 are used to produce simultaneously a plurality of diaphragms. Each die pair is substantially the same as that in FIG. 7 except that the respective inner surfaces of the dies are formed with peripheral recesses 21A to 27A and 21B to 27B in each of which a ring like, performed coating member is disposed. Dome shaped diaphragms are held by the die pairs respectively. Therefore, the diffusion zones are provided only in the peripheral portions of the diaphragms, respectively. FIG. 9B shows a plane view of a diaphragms, the peripheral portion of which is diffused with a suitable diffusion material. That is, the portion of the diaphragm by which it is supported is selectively diffused. With this construction, it is possible to increase the rigidity of the support portion without increasing the mass of the diaphragm substantially. The result is that the resonance frequency of the diaphragm in the high frequency region can be made higher, preferably higher than the upper limit of the audible range, to thereby cause the reproduction range of the loudspeaker to be widened.

Figure 10A:
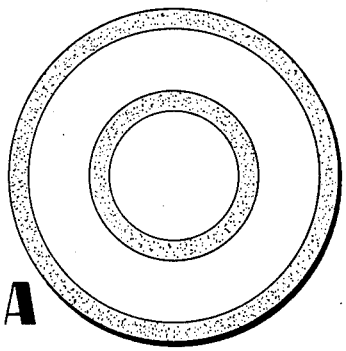
FIGS. 10A to 10E are plan views of various diaphragms which include selectively diffused zones respectively.
Figure 10B:
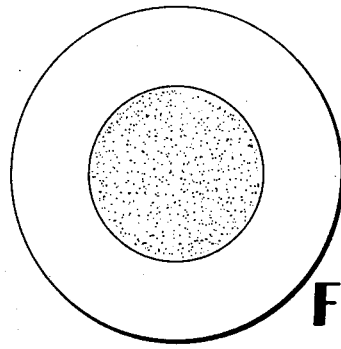
Figure 10C:
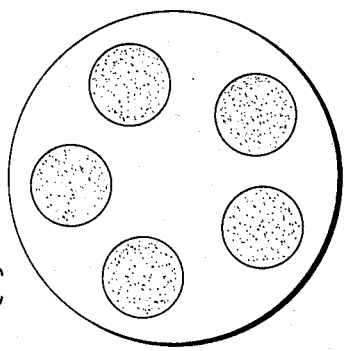
Figure 10D:
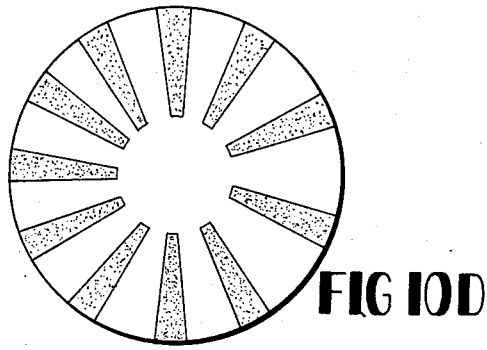
Figure 10E:
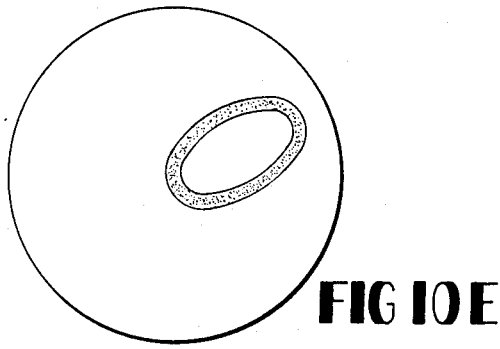

The portion of the diaphragm which is to be selectively diffused is arbitrary according to demands. For example, FIG. 10A shows coaxial diffusion zones and FIG. 10B shows a center diffusion zone. Further, FIG. 10C shows a plurality of diffusion zones arranged on a coaxial line, and FIG. 10D shows a plurality of radial diffusion zones. By arranging the diffusion zones symmetrically with respect to the center of the diaphragm, it may be possible to induce desirable local vibration while reducing undesirable vibrations. By suitably arranging them, it may be possible to flatten the frequency response of the loudspeaker. Further, FIG. 10E shows an elliptical diffusion zone. When the diffusion zone is neither coaxial nor symmetrical, as in the case shown in FIG. 10E, the generation of standing waves is substantially eliminated and desirable local vibrations can be produced in, particularily, the high frequency range, thereby contributing to the flattening of the frequency response.

In most of the examples described hereinbefore the vibrating member is a diaphragm for a loudspeaker. However, the present invention is also applicable to the case where the vibrating member is a cantilever for a pickup cartridge.

For example, FIG. 11 shows a boron diffusion to a cantilever 7'. In this embodiment, the boron coating layer 6 may be provided on the outer surface of the cantilever 7' in any of the previously mentioned methods. The cantilever 7', having formed on the surface thereof a boron coating layer 6, is inserted into an outer die 41 having a dimension suitable to tightly hold the cantilever, and an inner die 42 is inserted into the opening of the cantilever 7', as shown, to prevent any deformation of the cantilever. The assembly is heat-treated as in the previous embodiment to diffuse boron into the cantilever.

FIG. 12 shows another embodiment in which the boron diffusion is made from both surfaces of the cantilever 7'. That is, the inner and outer coating layers 6 and 6' are formed independently, previously. The outer coating layer 6 is inserted into the hole of the outer die 41 into which the cantilever 7' is inserted. The inner coating layer 6' is fitted on the inner die 42 and inserted into the hole of the cantilever 7' as shown to tightly hold the cantilever in the subsequent heat-treatment for diffusion.

FIG. 13 is another embodiment in which a selective diffusion is made by providing the coating layers 6 and 6' on a selected portion of the cantilever 7'. That is, the outer die 41 is provided with an increased inner diameter portion on which the preformed coating layer 6 is disposed and the inner die 42 has a reduced diameter portion which corresponds to the increased inner diameter portion of the die 41 and on which the inner coating layer 6' is suitably disposed as shown in FIG. 13. According to this embodiment, the rigidity of the root portion of the cantilever to which a magnet is to be mounted is selectively improved without substantial increase of the equivalent mass of the tip of a stylus to be mounted on the opposite end, resulting in an improvement in the reproduction frequency characteristics.

it is also possible to provide a plurality of diffusion zones in the cantilever as shown in FIGS. 14 and 15. The embodiment in FIG. 14 has a plurality of diffused zones arranged with intervals. With this construction, the mechanical impedance of the cantilever in high frequency sound is reduced without reproducing the cross modulation distortion component. By controlling the area of the diffused zones and the depth of the diffusion, it may be possible to further improve the characteristics of the cantilever.

FIG. 15 shows a modification of the embodiment in FIG. 14.

The control of the diffusion depth is easily performed by regulating the thickness of the coating layer or the boron density in the coating layer and by heat-treating under the same condition.

Several specific examples of the processes according to the present invention will now be described.

EXAMPLE 1

A thin plate of titanium, 25μ thickness, was shaped into a substrate suitable for a dome type diaphragm of an acoustic transducer. Coating layers were formed on both surfaces of the substrate by spraying thereon, from an electrostatic type spraying gun, boron powder containing boron particles, the diameter of which was in a range from 0.5μ to 5μ. The substrate with the boron coating layers thereon was placed in an electric furnace 11 (FIG. 4) and the furnace was exhausted to a pressure on the order of $10^{-4}$ Torr by exhausting air from the exhaust port 12. Thereafter, hydrogen gas was introduced through the inlet port 13 into the electric furnace to completely fill the interior thereof. Thereafter, an electric current was supplied to the heater coil 14 to raise the temperature of the interior of the furnace to 1000° C. and the temperature was maintained for one hour.

EXAMPLE 2

A dome type diaphragm substrate was formed using a carbon plate of 100μ thickness as the substrate. The substrate was treated in the same manner as in Example 1 except that the heat treatment temperature was 1500° C. and the treating time was three hours.

EXAMPLE 3

A pair of dies were used as shown in FIG. 5. The substrate 6 was prepared from a 50μ thick plate of titanium. A suspension solution was prepared by adding boron particles of 1μ to 8μ diameter to water, the suspension solution was sprayed by a spray gun onto both surfaces of the substrate 7, and the water content was volatilized to form boron coating layers 6 thereon. Thereafter, the substrate formed with the boron coating layers was tightly held between the pair of the metal dies 31 and 32 by the screws 33. The assembly was heated to a temperature of 1200° C. for two hours. The dies were used for preventing any deformation of the substrate due to the heating beyond the transition temperature of the substrate material and any deformation of the substrate and/or the coatings due to the difference in thermal expansion coefficiency between the substrate and the coatings.

EXAMPLE 4

A titanium pipe having a shape suitable to use it as a cantilever and a wall thickness of 10μ was prepared by the drawing technique. A suspension solution prepared by adding boron powder to trichloroethylene was sprayed onto the outer surface of the pipe except a portion thereof to which a stylus is to be mounted. The trichloroethylene was volatilized to form a boron coating on the pipe. The resultant pipe was tightly held by inserting the pipe into an outer die and by inserting an inner die into the pipe as shown in FIG. 11.

EXAMPLE 5

A die assembly was used in this example, comprising, as shown in FIG. 9, a plurality of separate dies 31 to 38, each pair of adjacent ones constituting a unit die assembly. The peripheral portion of the inner surface or surfaces of each die, which were to be intimately contacted with the surfaces of the substrates, were coated with boron by using the suspension solution prepared in the same manner as in Example 3. A plurality of dome shaped substrates of thin titanium plate of 50μ thickness were prepared and disposed in the respective unit die assemblies and the latter assemblies were tightened. Then the die assembly was heated to 1200° C. for two hours. Boron diffused throughout the thickness of the substrates.

EXAMPLE 6

The same boron coated dies as those in Example 3 were used. Putting the dies apart, a flat plate of titanium, 25μ thickness, was disposed between the dies as shown in FIG. 8. Then the dies were closed. By this closing of the dies, the flat plate of titanium was pressed and formed to the dome shape. After the dies were tightly assembled, the assembly was heated to 1000° C. and the temperature was maintained for one hour. As a result, boron diffused into the surfaces of the formed titanium diaphragm to a depth of 10μ.

EXAMPLE 7

A titanium pipe having the same size as that in Example 4 was prepared in the same manner as in Example 4 and preformed boron coatings were provided on both inner and outer surfaces of the pipe. The pipe formed on the both surfaces thereof with the boron coatings was fixed by substantially the same dies as those used in Example 4, as shown in FIG. 12, and then heated to 1000° C. for one hour. A cantilever was obtained, a substantial portion of which was diffused with boron throughout the wall thickness.

EXAMPLE 8

A substrate in the form of a cantilever was prepared from a plastic sheet containing carbon fibres as the major constituent. A pair of dies having substantially the same structures as those shown in FIG. 11 were used to fix the substrate. However, the outer die had an increased diameter portion in its inner surface, on which a formed coating of silicon was disposed and the inner die had a reduced diameter portion corresponding to the increased diameter portion of the outer die, on which a formed coating of silicon was disposed in the same manner, to diffuse silicon in these coatings into only the surface portions of the substrate which faced to the silicon coatings. After the substrate was fixed by these dies as shown in FIG. 13, it was heated to 1500° C. for two hours to form silicon diffused zones in the surface portions.

What is claimed is:

1. A method of fabricating a vibrating member suitable for use as the vibrating member of an acoustic vibrating system, said method being of the type wherein a first material is formed into the shape of a vibrating member, the improvement characterized by diffusing into at least one surface of said first material a second material selected from the group consisting of boron, nitrogen, silicon, and a material having as its main constituent boron, nitrogen or silicon.

2. The method of claim 1 wherein said first material is a material which is suitable for use or a vibrating member even in the absence of said second member.

3. The method of claim 1 wherein said first material is selected from the group consisting of aluminum, titanium, carbon, plastic filled with carbon fibers, and beryllium.

4. The method of claim 3 wherein the step of diffusing comprises burying said first material in a powder or particle bed of said second material and heating said combination to a sufficient temperature and for a sufficient time to cause migration of said second material into said first material.

5. The method of claim 3 wherein the step of diffusing comprises, electrostatically applying to at least one surface of said first material a coating of said second material and heating said first material and said coating to a sufficient temperature and for a sufficient time to cause migration of said second material into said first material.

6. The method of claim 3 wherein the step of diffusing comprises applying to at least one surface of said first material an evaporable liquid having particles of said second material suspended therein, evaporating said liquid to leave a coating of said second material, and heating said first material and said coating to a sufficient temperature and for a sufficient time to cause migration of said second material into said first material.

7. The method of claim 6 wherein said first material is titanium and said second material is boron, said particles of boron having a diameter of 50 micrometers or less.

8. The method of claim 7 wherein said liquid is water.

9. The method of claim 3 wherein the step of diffusing comprises, applying a coating of said second material to at least a part of at least one surface of said first material, pressing said first material and said coating between a male and female die having a space therebetween corresponding to the desired shape of the vibrating member, and heating said first material and coating while in said die to a sufficient temperature and for a sufficient time to cause migration of said second material into said first material.

10. The method of claim 9 wherein said first material is titanium and said second material is boron and wherein said heating step causes a boron diffusion zone within said titanium.

11. The method of claim 10 wherein said temperature is in the range of 900° C. to 1300° C. and said time is about two hours.

12. The method of claim 9 wherein the step of applying said coating to said first material comprises applying a coating of said second material to at least a part of at least one of the pressing surfaces of said male and female dies and subsequently pressing said thus coated dies against said first material.

13. The method of claim 9 wherein said first material is in plate form prior to placing same in said dies, and wherein the shaping step is carried out by said dies pressing said plate into the desired shape.

14. The method of claim 3 wherein said first material is titanium and said second material is boron.

15. The method of claim 14 wherein carbon black and sodium carbonate are added to said boron.

16. The method of claim 3 wherein said first material is carbon and said second material is boron.

17. The method of claim 3 wherein said first material is a plastic sheet filled with carbon fibers and said second material is silicon.

18. The method of claim 3 wherein said first material is titanium and wherein the step of diffusing comprises subjecting at least a part of at least one surface of said titanium material to ammonium gas in a sufficiently heated environment to form a zone of titanium nitride in said first material.

19. A vibrating member for an acoustic vibrating system, said vibrating member having the desired shape, the improvement characterized by said member having at least a zone portion thereof consisting of a diffusion material selected from the group consisting of boron, nitrogen, silicon, and a material having as its main constituent boron, nitrogen or silicon, which diffusion material is diffused into a substrate material selected from the group consisting of titanium, carbon, plastic filled with carbon fibers, aluminum, and beryllium, said substrate material being substantially free of any surface coating of said diffusion material.

20. The vibrating member of claim 19 wherein said portion is titanium having boron diffused therein, and wherein the part of said vibrating member other than said portion is titanium.

21. The vibrating member of claim 19 wherein said portion is titanium nitride and wherein the part of said vibrating member other than said portion is titanium.

22. The vibrating member of claim 19 wherein said portion is carbon having boron diffused therein, and wherein the part of said vibrating member other than said portion is carbon.

23. The vibrating member of claim 19 wherein said portion is carbon having silicon diffused therein, and wherein the part of said vibrating member other than said portion is carbon.

24. The vibrating member of claim 19 wherein said portion includes only the portion of said vibrating member which supports said member in said acoustic vibrating system.

25. The vibrating member of claim 19 wherein said portion constitutes said entire vibrating member.

26. The vibrating member of claim 19 wherein said member is a diaphragm and where said portion is asymmetrical.

27. The vibrating member of claim 19 wherein said member is a cantilever.

* * * * *